(12) United States Patent  
Sato

(10) Patent No.: US 12,247,925 B2  
(45) Date of Patent: Mar. 11, 2025

(54) ESTIMATION APPARATUS AND VEHICLE

(71) Applicant: SUBARU CORPORATION, Tokyo (JP)

(72) Inventor: Fumiya Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 295 days.

(21) Appl. No.: 17/885,019

(22) Filed: Aug. 10, 2022

(65) Prior Publication Data

US 2023/0073598 A1  Mar. 9, 2023

(30) Foreign Application Priority Data

Sep. 8, 2021 (JP) .................................. 2021-145992

(51) Int. Cl.
*G01N 21/84* (2006.01)
*G01W 1/00* (2006.01)
*B60W 40/068* (2012.01)

(52) U.S. Cl.
CPC .............. *G01N 21/84* (2013.01); *G01W 1/00* (2013.01); *B60W 40/068* (2013.01); *B60W 2552/35* (2020.02); *B60W 2552/40* (2020.02); *B60W 2555/20* (2020.02)

(58) Field of Classification Search
CPC . G06F 15/00; B60W 40/02; B60W 30/18172; B60W 2555/15; B60W 2555/20
See application file for complete search history.

(56) References Cited

U.S. PATENT DOCUMENTS

| | | | |
|---|---|---|---|
| 6,650,987 B2* | 11/2003 | Kogure | B60T 8/172 701/80 |
| 2004/0138831 A1* | 7/2004 | Watanabe | B60T 8/1725 702/33 |
| 2007/0150156 A1* | 6/2007 | Matsuno | B60T 8/172 701/82 |
| 2015/0081170 A1* | 3/2015 | Kikuchi | B60G 17/06 701/37 |

(Continued)

FOREIGN PATENT DOCUMENTS

| | | |
|---|---|---|
| JP | 2000-002772 A | 1/2000 |
| JP | 2011-053184 A | 3/2011 |

(Continued)

*Primary Examiner* — John Kwon
(74) *Attorney, Agent, or Firm* — Rimon P.C.

(57) ABSTRACT

An estimation apparatus performs non-contact estimation of a friction coefficient of a road surface. The estimation apparatus includes at least one processor. The processor determines a state of the road surface and determine which of preset road-surface states the state of the road surface belongs to. The processor performs primary identification of a first range of a friction coefficient corresponding to the determined road-surface state on the basis of friction coefficient information and the determined state of the road surface. The friction coefficient information is sectioned for each of the road-surface states. The processor narrows down a range of the friction coefficient from the first range to a second range on the basis of the identified first range of the friction coefficient, and thereby perform secondary identification of the friction coefficient of the road surface. The second range is narrower than the first range.

12 Claims, 11 Drawing Sheets

(56) References Cited

U.S. PATENT DOCUMENTS

2023/0382390 A1\* 11/2023 Sato ................... B60W 40/068
2024/0317216 A1\* 9/2024 Jo ........................... G08G 1/16

FOREIGN PATENT DOCUMENTS

| JP | 2020-180924 A | 11/2020 |
| JP | 2021-092412 A | 6/2021 |
| WO | 2019/044242 A1 | 3/2019 |

\* cited by examiner

ESTIMATION APPARATUS AND VEHICLE

CROSS-REFERENCE TO RELATED APPLICATIONS

The present application claims priority from Japanese Patent Application No. 2021-145992 filed on Sep. 8, 2021, the entire contents of which are hereby incorporated by reference.

BACKGROUND

The technology relates to an estimation apparatus that is configured to perform non-contact estimation of a friction coefficient (a μ-value) of a vehicle, e.g., a tire, with respect to a road surface, and also relates to a vehicle.

A vehicle has excellent convenience for moving. For example, driving an automobile enables visiting various places. In order to improve safety of driving in such a case, it may be important to estimate a state of a road surface in a traveling direction of a vehicle in advance and with high accuracy.

For example, Japanese Unexamined Patent Application Publication (JP-A) No. 2020-180924 proposes the following technique of estimating a friction coefficient of a road surface. That is, an image of a road surface in a traveling direction of a movable body is captured by means of a polarization camera to determine which of two or more categories a road-surface state of the road surface belongs to. Further, the friction coefficient of the road surface is estimated on the basis of the determined category. For example, Japanese Unexamined Patent Application Publication (JP-A) No. 2000-002772 proposes a technique in which a road surface is irradiated with first infrared light and second infrared light, and a category of a state of a road surface is determined on the basis of information regarding reflected first infrared light and reflected second infrared light. Examples of the categories of the state of the road surface include "dry", "wet (with a small amount of water)", "wet (with a great amount of water)", "snow (with a low moisture content rate), and "snow (with a high moisture content rate)". For example, Japanese Unexamined Patent Application Publication (JP-A) No. 2011-053184 proposes the following technique. That is, microwave band thermal noise from a target on a road surface is measured, and a physical temperature is measured from infrared rays emitted from the target. Further, a surface state (snow, freezing, wet, or dry) of the target is determined on the basis of a ratio between the measured microwave band thermal noise and the measured physical temperature.

SUMMARY

An aspect of the technology provides an estimation apparatus configured to perform non-contact estimation of a friction coefficient of a road surface. The estimation apparatus includes one or more processors and one or more memories communicably coupled to the one or more processors. The one or more processors are configured to determine a state of the road surface and determine which of two or more road-surface states the state of the road surface belongs to. The two or more road-surface states are set in advance. The one or more processors are configured to perform primary identification of a first range of the friction coefficient corresponding to the determined state of the road surface on the basis of friction coefficient information and the determined state of the road surface. The friction coefficient information is sectioned in advance for each of the road-surface states and held in the one or more memories. The one or more processors are configured to narrow down a range of the friction coefficient from the first range to a second range on the basis of the identified first range of the friction coefficient, and thereby perform secondary identification of the friction coefficient of the road surface. The second range is narrower than the first range.

An aspect of the technology provides a vehicle that includes the above-described estimation apparatus and a sensor. The sensor is configured to detect the state of the road surface.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Existing techniques including techniques disclosed in JP-A No. 2020-180924, JP-A No. 2000-002772, and JP-A No. 2011-053184 still have room as follows to appropriately meet commercial needs.

The techniques including those disclosed in the patent documents described above are useful in that a state of a road surface is determined by means of a camera or an electric wave; however, it only performs simple determination of a kind or a state of the road surface, for example.

Although such a technique of determining the state of the road surface in a non-contact manner has been proposed, such a technique merely determines general slipperiness (a friction coefficient) based on the determined state of the road surface.

Accordingly, there is still room for further improvement in accuracy to apply such a technique to a finer control of a vehicle.

It is desirable to provide an estimation apparatus for a vehicle and a vehicle that are able to estimate slipperiness of a road surface in a front region in a traveling direction in advance and with high accuracy.

Described below is an example embodiment of the technology. For configurations other than those described below in detail, for example, a publicly-known vehicle structure or a publicly-known vehicle-mounted system including various publicly-known vehicle-mounted sensors may be additionally provided where appropriate.

[Vehicle 200]

Figure 1:
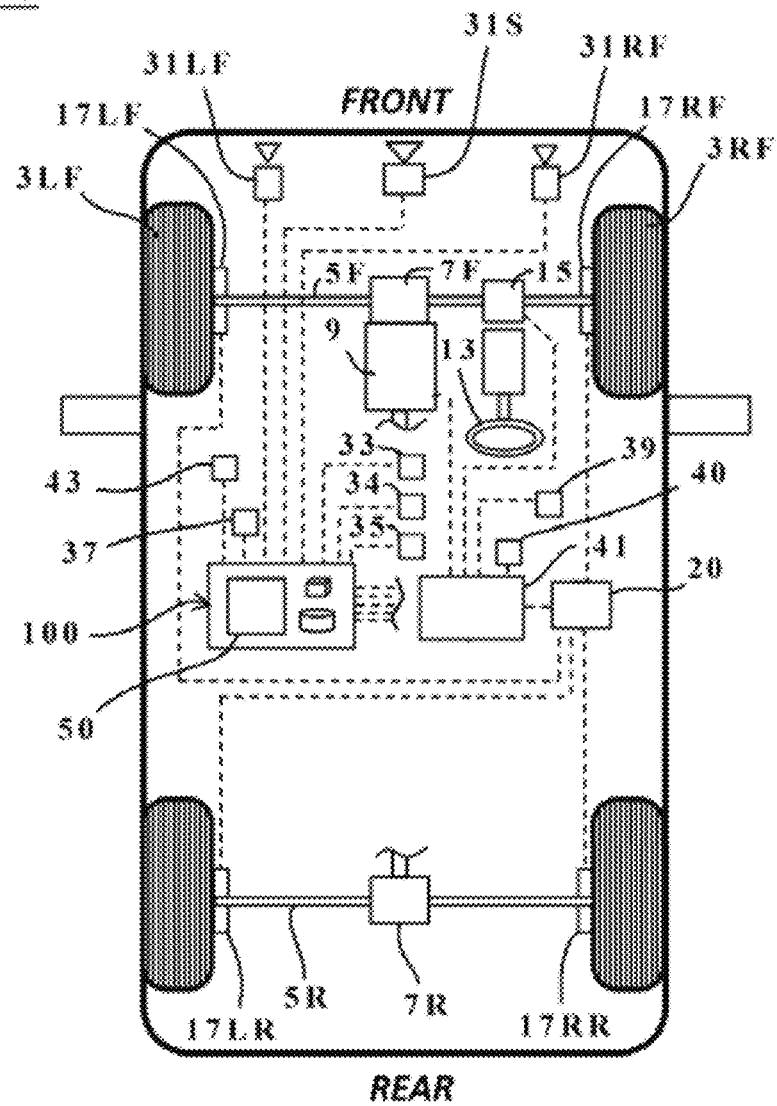
FIG. 1 is a block diagram illustrating a configuration example of a vehicle including an estimation apparatus according to one example embodiment of the technology.

FIG. 1 illustrates a configuration example of a vehicle 200 of the example embodiment. The following description refers to a four-drive-wheel automobile as an example of a vehicle applicable to the example embodiment; however, the example embodiment may be applied to a vehicle other than the four-drive-wheel automobile, such as a motorcycle, unless the gist of an embodiment of the technology is affected.

[Overall Configuration of Vehicle]

FIG. 1 is a schematic diagram illustrating the configuration example of the vehicle 200 including an estimation apparatus 100 according to the example embodiment. The vehicle 200 illustrated in FIG. 1 may be configured as a four-wheel-drive vehicle that transmits driving torque to a left front wheel 3LF, a right front wheel 3RF, a left rear wheel 3LR, and a right rear wheel 3RR (hereinafter collectively referred to as "wheels 3" unless a distinction is to be made between them). The driving torque may be outputted from a driving force source 9 that generates the driving torque of the vehicle 1. The driving force source 9 may be an internal combustion engine or a drive motor, or may include both the internal combustion engine and the drive motor. Non-limiting examples of the internal combustion engine may include a gasoline engine and a diesel engine.

The vehicle 200 may be, for example, an electric vehicle including two drive motors, i.e., a front wheel drive motor and a rear wheel drive motor; or an electric vehicle including drive motors corresponding to the respective wheels 3. In a case where the vehicle 200 is an electric vehicle or a hybrid electric vehicle, the vehicle 200 may be provided with, for example, a secondary battery that stores electric power to be supplied to the drive motor, or an electric power generator that generates electric power to be used to charge the battery. Non-limiting examples of the electric power generator may include a motor and a fuel cell.

As equipment to be used for a driving control of the vehicle 200, the vehicle 200 may include the driving force source 9, an electric steering system 15, and a brake hydraulic control unit 20. The driving force source 9 may output the driving torque to be transmitted to a front-wheel drive shaft 5F and a rear-wheel drive shaft 5R via an unillustrated transmission and a front-wheel differential mechanism 7F and a rear-wheel differential mechanism 7R. Driving of components including the driving force source 9 and the transmission may be controlled by a vehicle control apparatus 41 including one or more electronic control units (ECUs).

The front-wheel drive shaft 5F may be provided with the electric steering system 15. The electric steering system 15 may include, for example, an unillustrated electric motor and an unillustrated gear mechanism. The electric steering system 15 may be controlled by the vehicle control apparatus 41 to adjust a steering angle of the left front wheel 3LF and the right front wheel 3RF. During manual driving, the vehicle control apparatus 41 may control the electric steering system 15 on the basis of a steering angle of a steering wheel 13 operated by a driver who drives the vehicle 200.

A brake system of the vehicle 200 may be configured as a hydraulic brake system. The brake hydraulic control unit 20 may adjust hydraulic pressure to be supplied to brake calipers 17LF, 17RF, 17LR, and 17RR provided on the left front wheel 3LF, the right front wheel 3RF, the left rear wheel 3LR, and the right rear wheel 3RR, respectively, to thereby generate braking force. Driving of the brake hydraulic control unit 20 may be controlled by the vehicle control apparatus 41. In a case where the vehicle 200 is an electric vehicle or a hybrid electric vehicle, the brake hydraulic control unit 20 may be used in combination with regenerative braking performed using the drive motor.

The vehicle control apparatus 41 may include one or more electronic control units that control driving of the driving force source 9 outputting the driving torque for the vehicle 200, the electric steering system 15 controlling the steering angle of the steering wheel 13 or steered wheels, and the brake hydraulic control unit 20 controlling braking force of the vehicle 200. In one example, the vehicle control apparatus 41 may be configured to control driving of the transmission that changes in speed an output outputted from the driving force source 9 and transmits the output changed in speed to the wheels 3. The vehicle control apparatus 41 may be configured to acquire information transmitted by the estimation apparatus 100 described later, and to execute a vehicle control based on a result of estimation of a friction coefficient of a road surface performed by the estimation apparatus 100.

The vehicle 200 may include, for example, a surrounding environment sensor 31, an occupant monitoring sensor 33, a biosensor 34, a vehicle state sensor 35, a global positioning system (GPS) sensor 37, a vehicle-to-vehicle communication unit 39, a navigation system 40, and a human machine interface (HMI) 43.

Among the above components, the surrounding environment sensor 31 may include a road-surface temperature sensor detecting a temperature of a road surface, an unevenness detection sensor configured to detect unevenness of a road surface, and a moisture amount sensor configured to detect a moisture amount of a road surface, which will be described later. As the sensor detecting the temperature of the road surface, any of various publicly-known temperature sensors may be applied. Non-limiting examples of such a publicly-known temperature sensor may include the one disclosed in Japanese Unexamined Patent Application Publication No. 2015-038516. As the unevenness detection sensor configured to detect unevenness of a road surface, for example, a device (a road-surface unevenness detection sensor) disclosed in Japanese Unexamined Patent Application Publication No. 2004-138549, any of various publicly-known methods disclosed in Japanese Unexamined Patent Application Publication No. 2013-061690, or a laser rangefinder may be applied. As the moisture amount sensor configured to detect a moisture amount of a road surface, for example, any of various publicly-known moisture-amount detection sensors may be applied. Non-limiting examples of such a publicly-known moisture-amount detection sensor may include the one disclosed in Japanese Unexamined Patent Application Publication No. 2006-046936.

In one example, the surrounding environment sensor 31 of the example embodiment may also include front imaging cameras 31LF and 31RF, a rear imaging camera 31R, and a light detection and ranging (LiDAR) 31S.

The front imaging cameras 31LF and 31RF, the rear imaging camera 31R, and the LiDAR 31S may serve as a surrounding environment sensor adapted to acquiring information regarding a surrounding environment of the vehicle 200. The front imaging cameras 31LF and 31RF may perform imaging of a region in front of the vehicle 200 to generate image data. The rear imaging camera 31R may perform imaging of a region in rear of the vehicle 200 to generate image data. The front imaging cameras 31LF and 31RF and the rear imaging camera 31R may each include an imaging sensor, such as a charged-coupled device (CCD) or a complementary metal-oxide-semiconductor (CMOS), and transmit the generated image data to the estimation apparatus 100.

In the vehicle 200 illustrated in FIG. 1, the front imaging cameras 31LF and 31RF may be configured as a stereo camera including a pair of left and right cameras, and the rear imaging camera 31R may be configured as a so-called monocular camera. However, the front imaging cameras 31LF and 31RF and the rear imaging camera 31R may each be either a stereo camera or a monocular camera. In addition to the front imaging cameras 31LF and 31RF and the rear imaging camera 31R, the vehicle 200 may further include, for example, a publicly-known camera that is provided on a side-view mirror to perform imaging of a left-rear region or a right-rear region.

The LiDAR 31S may transmit an optical wave and receive a reflected wave of the transmitted optical wave, and detect an object and a distance to the object on the basis of a time from transmission of the optical wave to reception of the reflected wave. The LiDAR 31S may be configured to transmit detection data to the estimation apparatus 100. In place of the LiDAR 31S or together with the LiDAR 31S, the vehicle 200 may include one or more of publicly-known sensors including radar sensors and ultrasonic sensors as the surrounding environment sensor 31 adapted to acquiring the information regarding the surrounding environment. Non-limiting examples of the radar sensors may include millimeter-wave radars.

The occupant monitoring sensor 33 may include an in-vehicle imaging camera 33c. The in-vehicle imaging camera 33c may include one or more publicly-known sensors detecting information regarding the driver who drives the vehicle 200. The in-vehicle imaging camera 33c may include an imaging device such as a CCD or a CMOS, and perform imaging of an inside of the vehicle 200 to generate image data. The in-vehicle imaging camera 33c may be configured to transmit the generated image data to the estimation apparatus 100. In the example embodiment, the in-vehicle imaging camera 33c may be so disposed as to perform imaging of the driver who drives the vehicle 200. The provided in-vehicle imaging camera 33c may be only one in number, or may be two or more in number.

The biosensor 34 may be configured to detect biometric information of the driver and transmit detection data to the estimation apparatus 100. As the biosensor 34, any of various publicly-known sensors may be applicable. For example, the biosensor 34 may include an electric-wave Doppler sensor adapted to detecting a heart rate of the driver, or may be a non-worn pulse sensor adapted to detecting a pulse of the driver. For example, the biosensor 34 may be a pair of electrodes embedded in the steering wheel 13 to measure a heart rate or to obtain an electrocardiogram of the driver.

The vehicle state sensor 35 may include one or more publicly-known sensors that detect an operation state and behavior of the vehicle 200. For example, the vehicle state sensor 35 may include one or more of a steering angle sensor, an accelerator position sensor, a brake stroke sensor, a brake pressure sensor, or an engine speed sensor. The vehicle state sensor 35 may thus detect the operation state of the vehicle 200, such as the steering angle of the steering wheel 13 or the steered wheels, an accelerator position, a brake operation amount, or an engine speed. For example, the vehicle state sensor 35 may include one or more of a vehicle speed sensor, an acceleration rate sensor, or an angular velocity sensor. The vehicle state sensor 35 may thus detect the behavior of the vehicle 200, such as a vehicle speed, a longitudinal acceleration rate, a lateral acceleration rate, or a yaw rate. The vehicle state sensor 35 may also include a sensor detecting an operation performed on a turn signal lamp and detect an operation state of the turn signal lamp. The vehicle state sensor 35 may also include a sensor detecting an inclination state of the vehicle 200 and detect an inclination state of a road. The vehicle state sensor 35 may transmit a sensor signal including the detected information to the estimation apparatus 100.

The vehicle-to-vehicle communication unit 39 may be an interface adapted to performing communication with another vehicle traveling around the vehicle 200.

The navigation system 40 may be a publicly-known navigation system that sets a traveling route to a destination set by an occupant and notifies the driver of the set traveling route. Coupled to the navigation system 40 may be the GPS sensor 37. The navigation system 40 may receive satellite signals from GPS satellites via the GPS sensor 37 to acquire position information of the vehicle 200 on map data. In place of the GPS sensor 37, an antenna may be provided to receive satellite signals from another satellite system that identifies a position of the vehicle 200.

The HMI 43 may be driven by the estimation apparatus 100 to present various pieces of information to the driver by, for example, displaying an image or outputting sound. The HMI 43 may include, for example, a display provided in an instrument panel and a speaker provided in the vehicle 200. For example, the display may serve as a display of the navigation system 40. The HMI 43 may include a head-up display that displays an image on a front window of the vehicle 200.

[Estimation Apparatus 100]

Next, described is a configuration example of the estimation apparatus 100 according to the example embodiment. The estimation apparatus 100 may estimate a friction coefficient of a road surface in a front region of the traveling vehicle 200.

Figure 2:
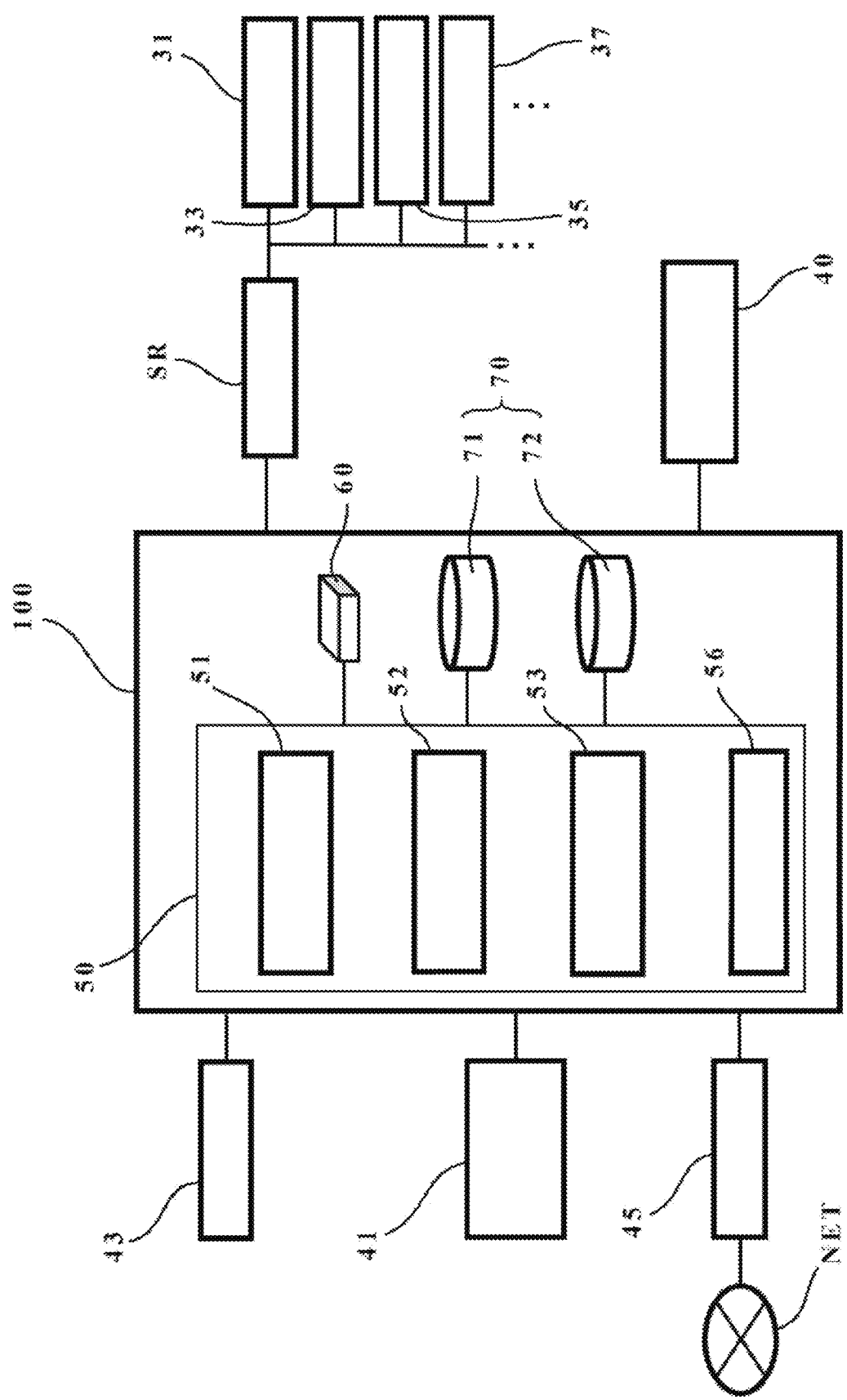
FIG. 2 is a block diagram illustrating a configuration example of the estimation apparatus and peripheral apparatuses.

FIG. 2 is a block diagram illustrating the configuration example of the estimation apparatus 100 according to the example embodiment.

Sensors SR may be coupled to the estimation apparatus 100 via a dedicated line or a communication system such as a controller area network (CAN) or a local interconnect network (LIN). The sensors SR may include, for example, the surrounding environment sensor 31, the occupant monitoring sensor 33, the biosensor 34, the vehicle state sensor 35, and the GPS sensor 37. The vehicle-to-vehicle communication unit 39, the navigation system 40, the vehicle control apparatus 41, and the HMI 43 described above may also be coupled to the estimation apparatus 100 via a dedicated line or a communication system such as a CAN or a LIN. The estimation apparatus 100 may be connectable to an external network NET such as the Internet via a publicly-known communication system 45.

Such an estimation apparatus 100 according to the example embodiment may include a controller 50 and a publicly-known storage including a memory 60 and a database 70. The controller 50 may include one or more processors. Non-limiting examples of the one or more processors may include a central processing unit (CPU) or CPUs. The controller 50 may partially or entirely be updatable software such as firmware, or a program module to be executed in accordance with a command given from the CPU or the CPUs, for example. The memory 60 of the storage may include a publicly-known memory device such as a random-access memory (RAM) or a read-only memory (ROM).

The database 70 of the storage may include a rewritable publicly-known recording medium such as a solid state drive (SSD), a hard disk drive (HDD), an USB flash, or a storage device. Note that the storage is not particularly limited in number or kind in the example embodiment. In one example, the storage of the example embodiment may hold a computer program to be executed by the controller 50, various parameters to be used in a calculation process, detection data, and information such as a calculation result.

The database 70 of the example embodiment may include a primary identification database 71 and a secondary identification database 72. The primary identification database 71 may be used to perform primary identification of a friction coefficient of a road surface. The secondary identification database 72 may be used to narrow down the friction coefficient for each state (kind) of the road surface.

The primary identification database 71, the secondary identification database 72, or both of the database 70 may be mounted on the vehicle 200, or may be stored in an external server communicable with the estimation apparatus 100 via a wireless communication system such as mobile body communication. Alternatively, a portion or all of each of the primary identification database 71 and the secondary identification database 72 may be provided as a single database.

As illustrated in FIG. 2, the controller 50 of the example embodiment may include a road-surface state detection unit 51, a μ-value parameter acquisition unit 52, a μ-value calculation unit 53, and a vehicle control unit 56.

The road-surface state detection unit 51 may be configured to detect a state of a road surface on which the vehicle 200 travels. For example, the road-surface state detection unit 51 may be configured to determine the state of the road surface from matrix data illustrated in FIG. 4 on the basis of information received from each of a publicly-known road-surface temperature sensor, a publicly-known road-surface unevenness detection sensor, and a publicly-known road-surface moisture amount sensor.

Figure 4:
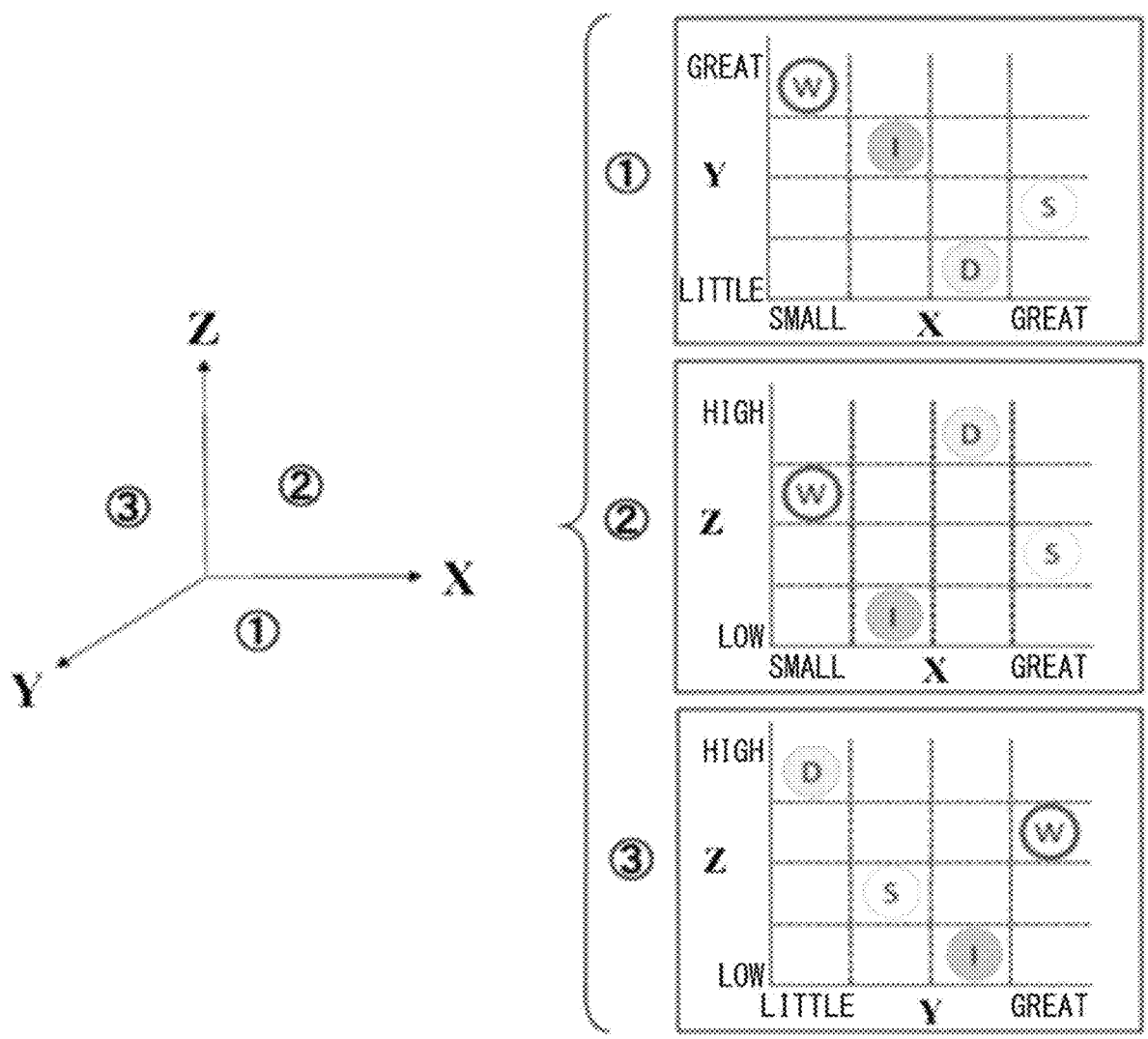
FIG. 4 is a schematic diagram illustrating a map for determining a state of a road surface, applicable to first identification.

That is, as illustrated in FIG. 4, the road-surface state detection unit 51 may be configured to detect which of four states the above-described state (kind) of the road surface on which the vehicle 200 travels belongs to, on the basis of a relationship among a road-surface temperature, road-surface unevenness, and a road-surface moisture amount. The four states may include DRY, WET, SNOW, and ICE. The above-described relationship among the road-surface temperature, the road-surface unevenness, and the road-surface moisture amount may be matrix data in which the relationship is represented in a matrix in advance. The matrix data representing the relationship among the road-surface temperature, the road-surface unevenness, and the road-surface moisture amount illustrated in FIG. 4 may be stored in the primary identification database 71. Thus, the road-surface state detection unit 51 may refer to the matrix data stored in the primary identification database 71 to identify the state of the road surface on the basis of the data regarding the road-surface temperature, the road-surface unevenness, and the road-surface moisture amount actually measured by the above-described respective sensors.

Although the road-surface state detection unit 51 of the example embodiment may determine the state of the road surface on the basis of the road-surface temperature, the road-surface unevenness, and the road-surface moisture amount as described above, the embodiment of the technology is not limited to this example. For example, upon determining the above-described four states, for example, a publicly-known determination technique may be applied as long as such application of the technique does not cause inconsistency with the gist of the embodiment of the technology. Non-limiting examples of such a publicly-known determination technique may include a technique using image analysis described in JP-A No. 2020-180924. Upon the determination of the road-surface state, the road-surface states to be used are not limited to the above-described four states (DRY, WET, SNOW, and ICE), and any other publicly-known road-surface state may be applied.

The road-surface state detection unit 51 of the example embodiment may also be configured to, after detecting which of the four states (DRY, WET, SNOW, and ICE) the above-described state of the road surface belongs to, identify a first range of a friction coefficient on the basis of the detected road-surface state.

Figure 5:
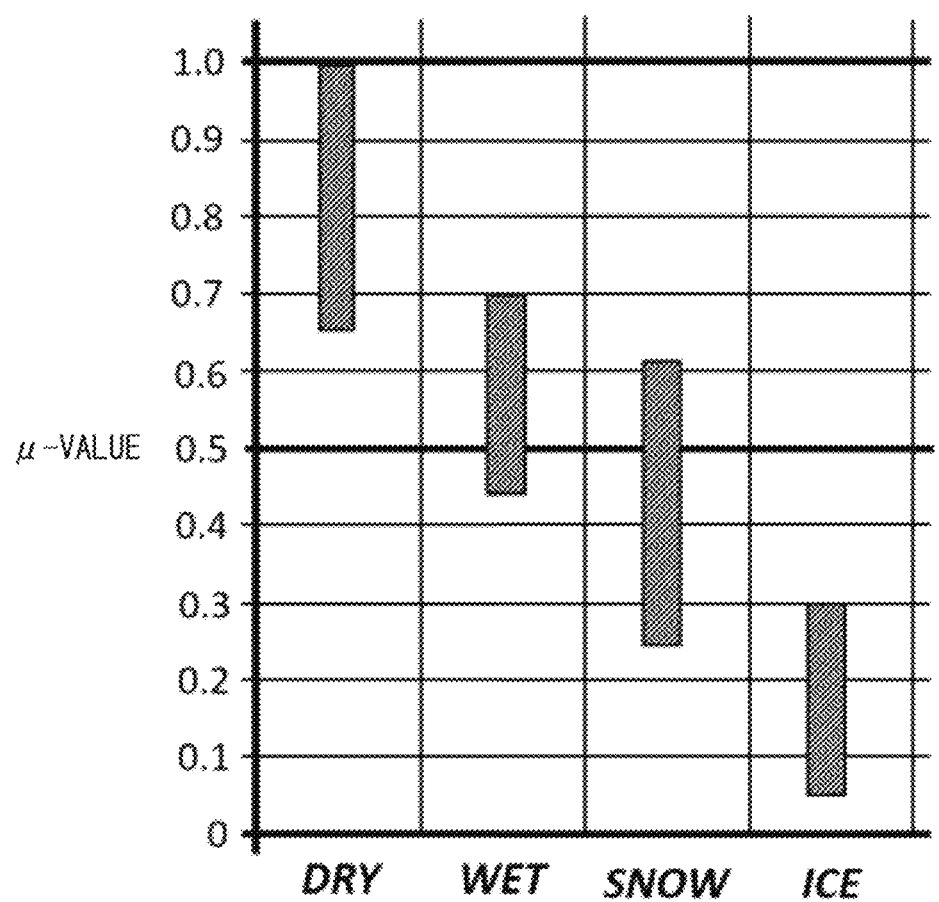
FIG. 5 is a schematic diagram illustrating an example (a range section) of a data table of friction coefficients corresponding to the determined state of the road surface.

That is, the road-surface state detection unit 51 may identify a range of a friction coefficient corresponding to the detected road-surface state on the basis of a range data table of friction coefficients that defines a range of a friction coefficient for each state, such as the one illustrated in FIG. 5. For example, in a case where the road-surface state detection unit 51 identifies the state of the road surface as "DRY" on the basis of the matrix data illustrated in FIG. 4, the road-surface state detection unit 51 may refer to the range data table of the friction coefficients illustrated in FIG. 5 and identify the range of the friction coefficient as "from 0.66 to 0.99".

Note that the range data table of the friction coefficients illustrated in FIG. 5 is a mere example. For example, the range data table of the friction coefficients may be defined on the basis of an experiment or a simulation, and may be stored in the primary identification database 71.

Although the range data table defined for each road-surface state may be used as a primary database for the friction coefficient in the example embodiment, the embodiment of the technology is not limited thereto. As the primary database for the friction coefficient, for example, typical average-value data of friction coefficient defined for each road-surface state, such as the one illustrated in FIG. 6, may be used. Alternatively, range data further taking into consideration standard deviation for the average value of the friction coefficients (e.g., a range of an average value ±0.2 σ), such as the one illustrated in FIG. 7, may be used. As with the range data table of the friction coefficients illustrated in FIG. 5, such average-value data or average-value-based range data may be defined on the basis of an experiment or a simulation and stored in the primary identification database 71.

The μ-value parameter acquisition unit 52 may be configured to acquire a μ-value-related parameter for further narrowing down the range of the friction coefficient from that primarily identified by the road-surface state detection unit 51.

In the example embodiment, the term "μ-value-related parameter" refers to a parameter that contributes to or has a relatively high influence on a μ-value defined for each road-surface state (kind).

That is, the μ-value of the road surface may be a value representing a friction phenomenon caused between the road surface and a tire of the vehicle 200. In the example embodiment, the following μ-value-related parameters may be taken into consideration: (α) friction force of rubber, (β) snow column shearing force, and (γ) edge effect. For example, in a case where a road-surface state of a front region of the road surface on which the vehicle 200 travels is "DRY", (α) friction force of rubber (force that deforms rubber by unevenness of the road surface, which can be understood as hysteresis friction) may be dominating among the μ-value-related parameters. Accordingly, for example, the "unevenness of the road surface" may be selected as the μ-value-related parameter.

Similarly, for example, in a case where the road-surface state of the front region of the road surface on which the vehicle 200 travels is "WET", (α) friction force of rubber (force generated by trying to be closely attached to the road surface, which can be understood as adhesion friction) may be dominating among the μ-value-related parameters. Accordingly, for example, a "thickness of a water film" may be selected as the μ-value-related parameter in the example embodiment.

Similarly, for example, in a case where the road-surface state of the front region of the road surface on which the vehicle 200 travels is "SNOW", (β) snow column shearing force (force to shear a treaded snow column) may be dominating among the μ-value-related parameters. Accordingly, for example, a "density", a "temperature of the road surface", or a "moisture content rate" may be selected as the μ-value-related parameter in the example embodiment.

Similarly, for example, in a case where the road-surface state of the front region of the road surface on which the vehicle 200 travels is "ICE", (α) friction force of rubber (adhesion friction) and (γ) edge effect (force to scratch the road surface) may be dominating among the μ-value-related parameters. Accordingly, for example, the "temperature of the road surface" or the "thickness of the water film" may be selected as the μ-value-related parameter in the example embodiment.

Note that the selections of the μ-value-related parameter corresponding to the road-surface state described above are mere examples, and any parameter contributing to the μ-value, other than the μ-value-related parameters described above, may be selected as appropriate, for example, on the basis of an experiment or a simulation.

The μ-value calculation unit 53 may be configured to perform calculation to further narrow down the range of the friction coefficient detected in relation to the road-surface state, on the basis of the μ-value-related parameter acquired by the μ-value parameter acquisition unit 52. For example, the μ-value calculation unit 53 may refer to a μ-value narrowing table corresponding to each of the road-surface states and perform secondary identification of the friction coefficient (the μ-value) with use of the μ-value-related parameter acquired by the μ-value parameter acquisition unit 52. FIGS. 8 to 11 each illustrate a non-limiting example of such a μ-value narrowing table.

Figure 9:
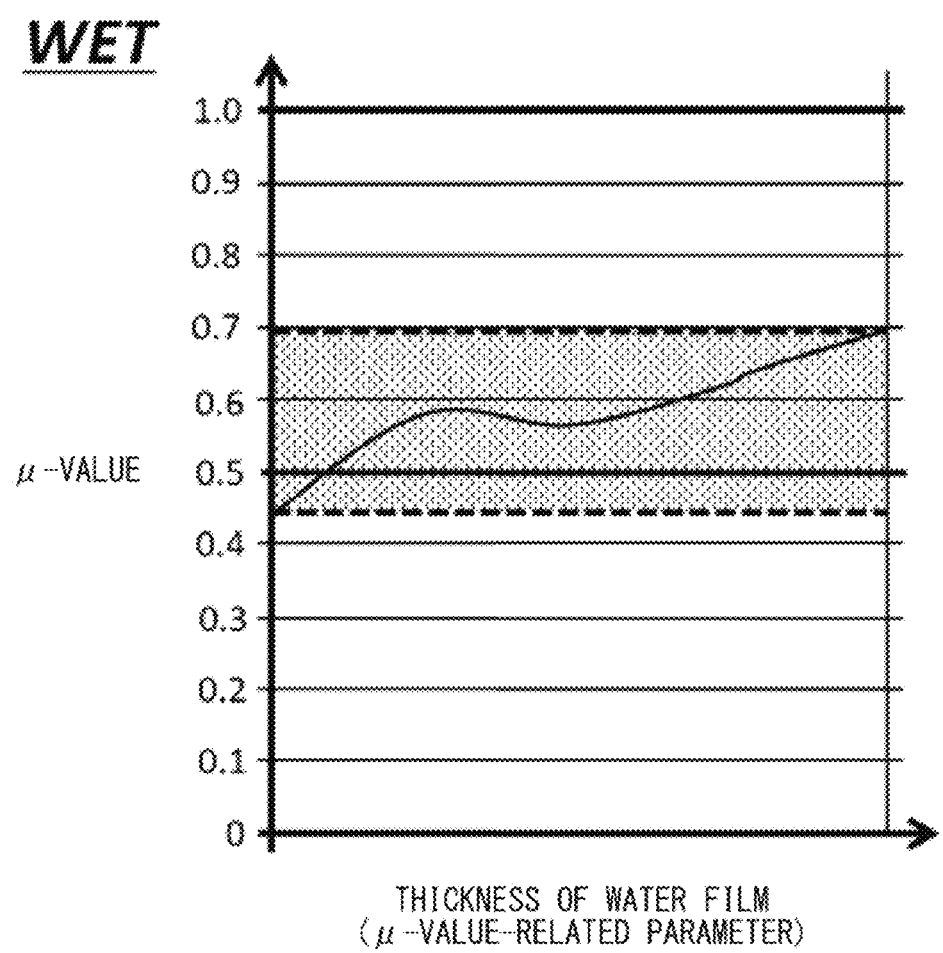
FIG. 9 is a schematic diagram illustrating a data table for narrowing down the friction coefficient for WET, applicable to the secondary identification.
Figure 10:
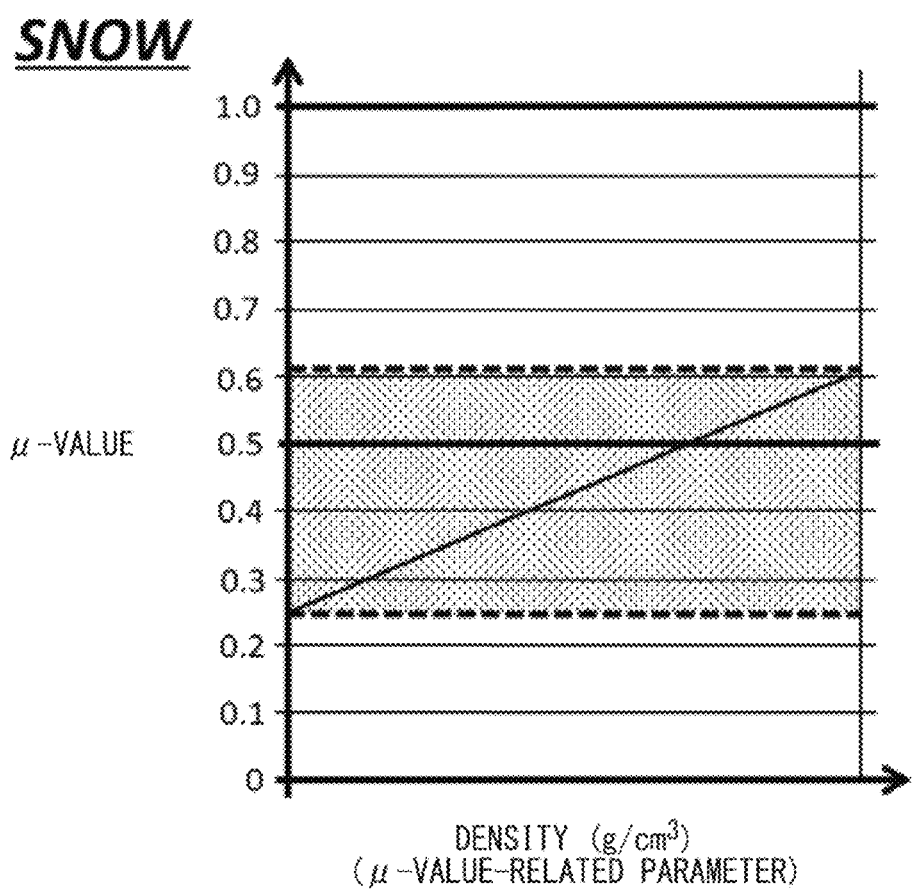
FIG. 10 is a schematic diagram illustrating a data table for narrowing down the friction coefficient for SNOW, applicable to the secondary identification.
Figure 11:
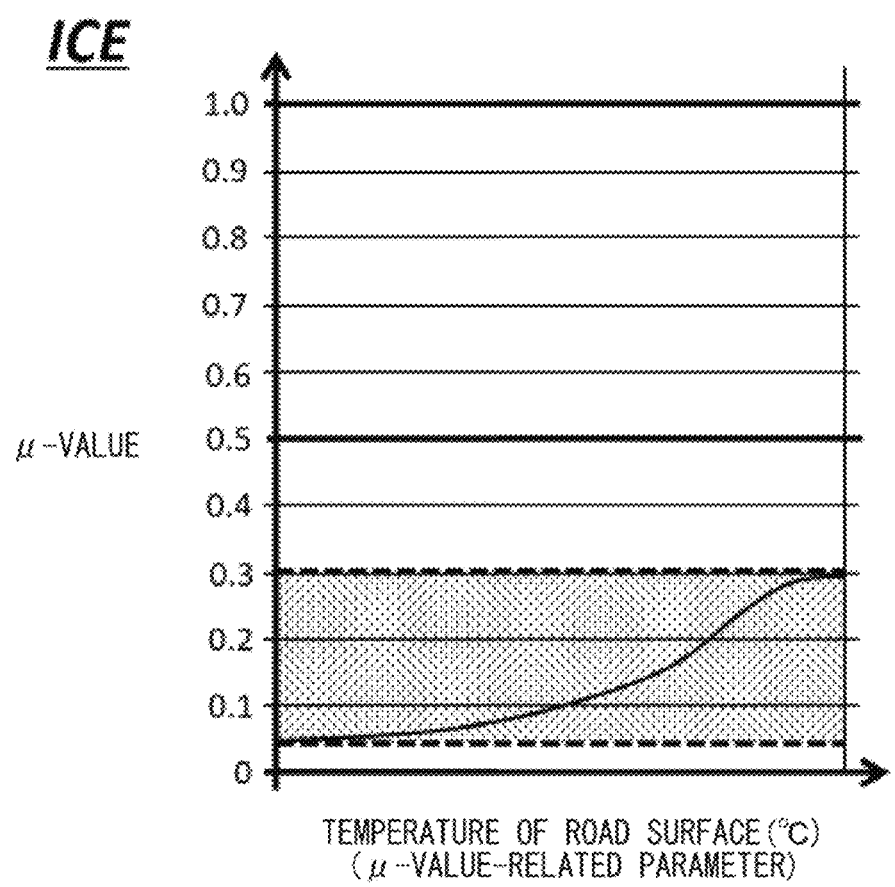
FIG. 11 is a schematic diagram illustrating a data table for narrowing down the friction coefficient for ICE, applicable to the secondary identification.

For example, in a case where the road-surface state detection unit 51 detects the road-surface state as "WET", the μ-value calculation unit 53 may refer to the μ-value narrowing table illustrated as an example in FIG. 9 on the basis of the moisture amount (the thickness of the water film) acquired by the μ-value parameter acquisition unit 52, and further narrow down the friction coefficient (the μ-value) of the road surface to travel, i.e., perform the secondary identification. In the example embodiment, the μ-value may be narrowed down to a single point upon the secondary identification; however, this is non-limiting. In one example, the range of the μ-value may be further narrowed down from the range primarily identified to another range.

The controller 50 of the example embodiment may be configured to, upon the secondary identification of the range of the friction coefficient, select the μ-value-related parameter corresponding to the friction force of the rubber, the snow column shearing force, and the edge effect caused between the tire of the vehicle 200 and the road surface, narrow down the range of the friction coefficient from a first range to a second range on the basis of the selected μ-value-related parameter, and thereby estimate the friction coefficient of the road surface.

The vehicle control unit 56 may be configured to control the vehicle 200 on the basis of the value of the friction coefficient of the road surface to which the μ-value calculation unit 53 has narrowed down the range of the friction coefficient. Non-limiting examples of such a vehicle control based on the narrowed-down value of the friction coefficient of the road surface may include a control of drawing attention of an occupant by means of the HMI 43, or a control of adjusting the driving torque of the vehicle 200 by means of the vehicle control apparatus 41.

[Method of Estimating Friction Coefficient of Road Surface to Travel]

Figure 3:
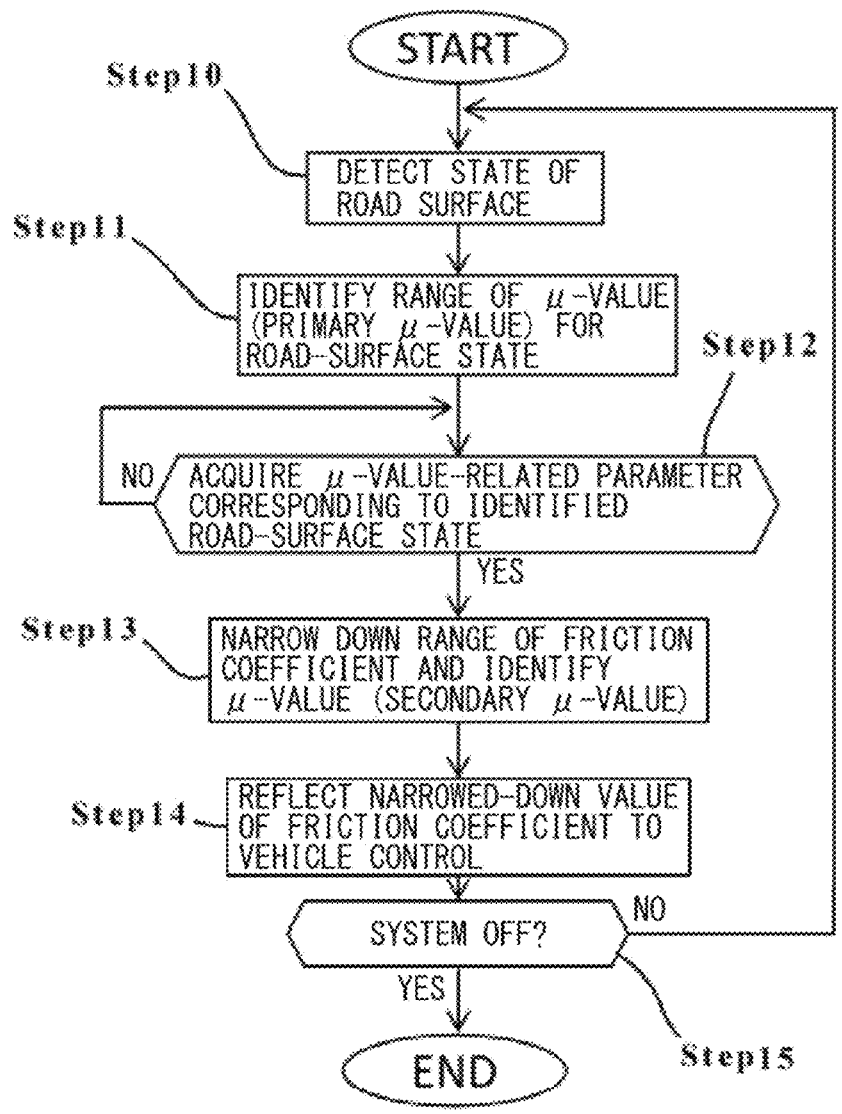
FIG. 3 is a flowchart illustrating a method of estimating a friction coefficient of a road surface to be executed by the estimation apparatus according to one example embodiment.

Next, referring to FIG. 3, described is a method of estimating the friction coefficient of the front region of the road surface on which the vehicle 200 travels in the example embodiment. Note that the following method of estimating the friction coefficient may be executed by the estimation apparatus 100 in a non-contact manner.

First, in Step 10, the road-surface state detection unit 51 may detect the road-surface state of the front region of the road surface on which the vehicle 200 travels, on the basis of, for example, information received from the surrounding environment sensor 31. Thus, which of the road-surface states the state of the road surface belongs to may be determined. The road-surface states may include, for example, DRY, WET, SNOW, and ICE. To give an example, here, assume that the road-surface state detection unit 51 determines the road-surface state of the front region of the road surface to travel as "WET".

Thereafter, in Step 11, the range of the μ-value (a primary μ-value) defined for each of the road-surface states may be identified. That is, the road-surface state detection unit 51 may perform primary identification to identify the first range of the friction coefficient corresponding to the detected state (the road-surface state of "WET") as "from 0.45 to 0.70" on the basis of the determined road-surface state ("WET", in this example) and, for example, of the range data table of the friction coefficients illustrated as an example in FIG. 5.

Figure 6:
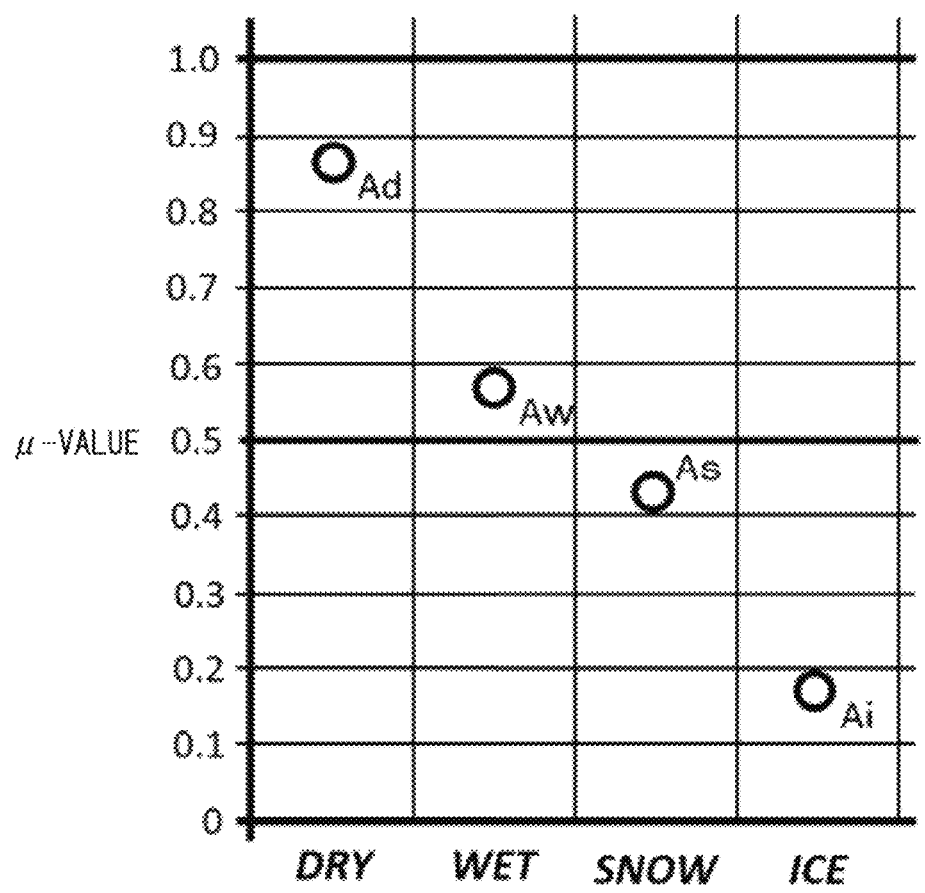
FIG. 6 is a schematic diagram illustrating another example (average-value based) of the data table of the friction coefficients corresponding to the determined state of the road surface.
Figure 7:
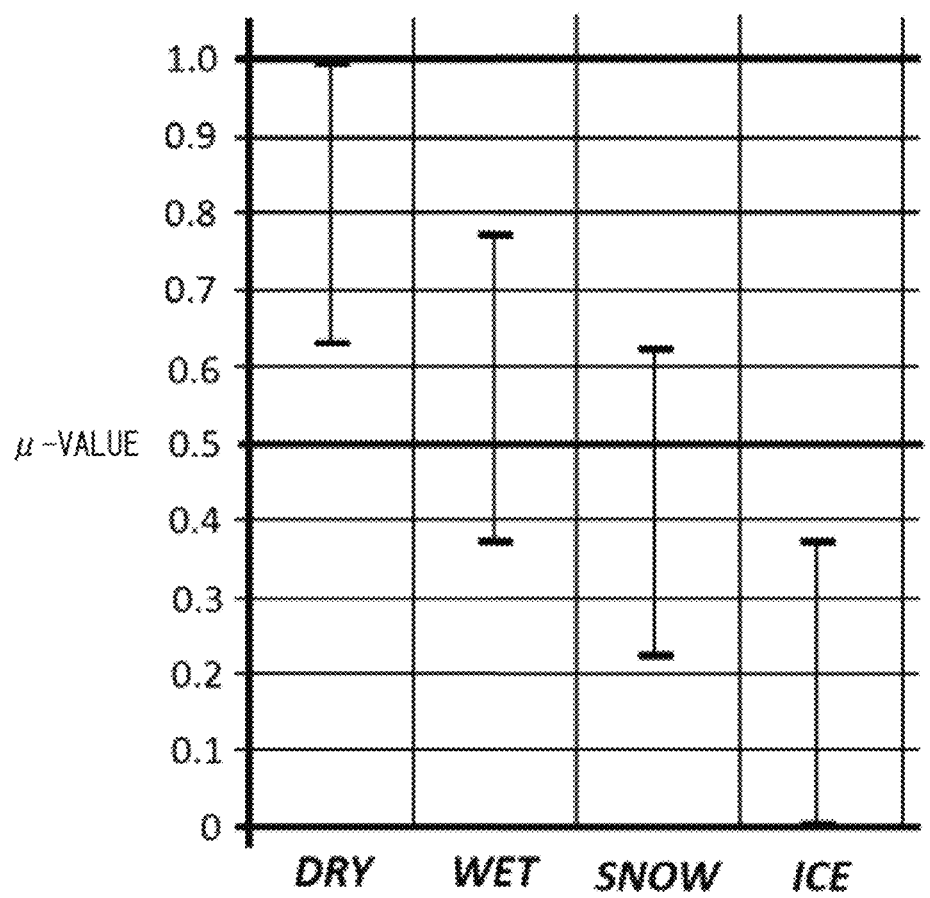
FIG. 7 is a schematic diagram illustrating still another example (average-value-based range section) of the data table of the friction coefficients corresponding to the determined state of the road surface.
Figure 8:
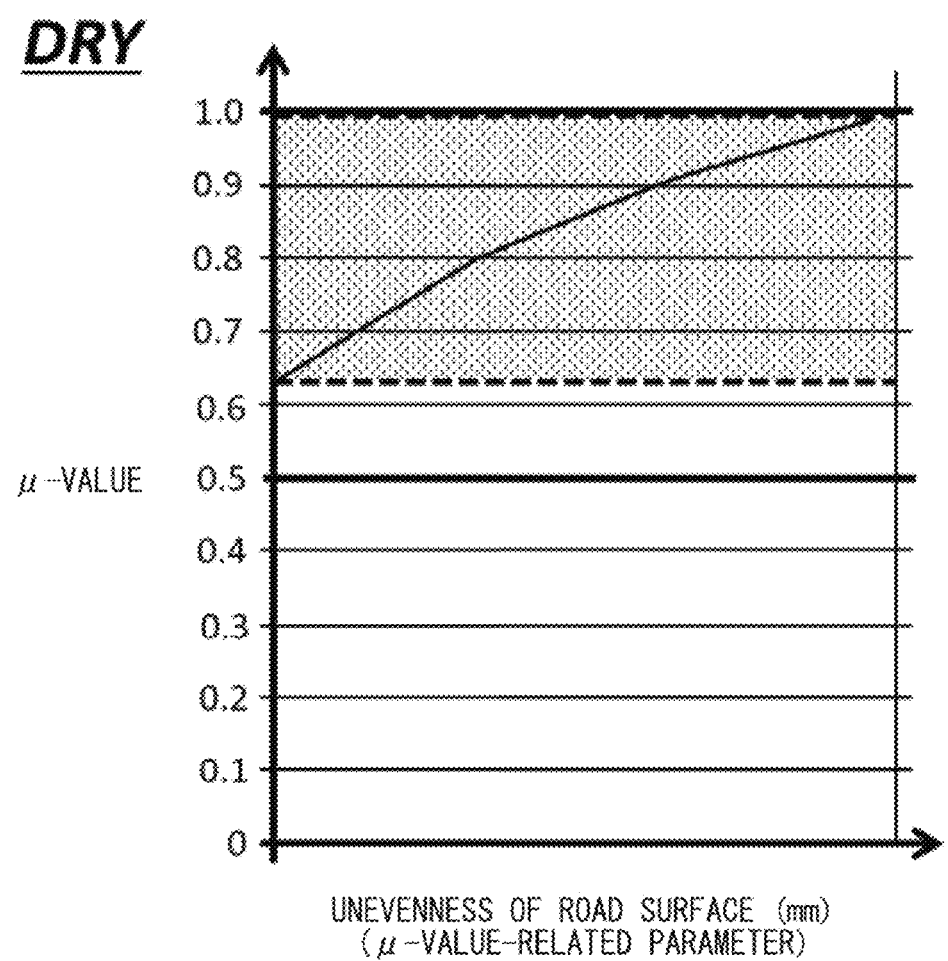
FIG. 8 is a schematic diagram illustrating a data table for narrowing down the friction coefficient for DRY, applicable to secondary identification.

As described above, the range data table applicable to this example is not limited to the data table defining the range of the friction coefficient corresponding to each of the road-surface states such as the one illustrated in FIG. 5, and may be the data table using the average value of the friction coefficients for each of the road-surface states such as the one illustrated in FIG. 6 or 7. The average value of the friction coefficients for each of the road-surface states may be a typical average value of the friction coefficients statistically derived for each road-surface state.

Thereafter, in Step 12 and Step 13, on the basis of the first range of the friction coefficient identified in Step 11, the range of the friction coefficient may be narrowed down from the first range to the narrower second range to perform secondary identification to identify the friction coefficient of the road surface.

First, in Step 12, the µ-value parameter acquisition unit 52 may acquire the µ-value-related parameter corresponding to the road-surface state identified by the road-surface state detection unit 51. Given that the road-surface state is determined as "WET" in Step 10 in this example, the µ-value parameter acquisition unit 52 may acquire, for example, the "thickness of the water film" and the "moisture amount" as the µ-value-related parameters on the basis of information detected by the surrounding environment sensor 31.

Note that a method of acquiring data of the "thickness of the water film" is not particularly limited. For example, the thickness of the water film on the road surface may be detected by a publicly-known method using an infrared-ray sensor, or may be detected by using a salt concentration sensor proposed in Japanese Unexamined Patent Application Publication No. 2021-092412 as the surrounding environment sensor 31. Likewise, a method of acquiring data of the "moisture amount" is not particularly limited. For example, a publicly-known moisture-amount sensor such as a sensor disclosed in International Publication No. WO2019/044252 may be used.

Thus, in a case where the determined road-surface state falls in the "WET" section, the µ-value parameter acquisition unit 52 of the example embodiment may select the "thickness of the water film" as the µ-value-related parameter corresponding to the friction force of the rubber.

In a case where the determined road-surface state falls in the "DRY" section, the µ-value parameter acquisition unit 52 may select the "unevenness of the road surface" as the µ-value-related parameter corresponding to the friction force of the rubber. Note that a method of acquiring data of the "unevenness of the road surface" is not particularly limited. For example, the "unevenness of the road surface" may be detected by a publicly-known method using an infrared-ray sensor as the surrounding environment sensor 31.

In a case where the determined road-surface state falls in the "SNOW" section, the µ-value parameter acquisition unit 52 may select at least one of the "density", the "temperature of the road surface", or the "moisture content rate" as the µ-value-related parameter corresponding to the snow column shearing force. Note that a method of acquiring data of the "density" and the data of the "moisture content rate" are each not particularly limited. For example, the "density" and the "moisture content rate" may be detected by a publicly-known method using an infrared-ray sensor as the surrounding environment sensor 31.

Thereafter, in Step 13, the range of the friction coefficient may be further narrowed down from the primarily identified range in accordance with the road-surface state to perform the secondary identification of the friction coefficient (the µ-value) of the road surface to travel. For example, given that the road-surface state is "WET" in this example, the µ-value calculation unit 53 may identify the friction coefficient (the µ-value) of the WET-state road surface to travel as "0.6" on the basis of the "thickness of the water film" acquired by the µ-value parameter acquisition unit 52 and the µ-value narrowing table described as an example in FIG. 9. Note that, although the value of the friction coefficient is identified as a single point in this example, it is not necessary to narrow down the value of the friction coefficient to a single point, and it is sufficient that the value of the friction value is narrowed down at least to the second range narrower than the first range which has been identified by the primary identification.

After the value of the friction coefficient of the front region of the road surface to travel is thus narrowed down, in Step 14, the value of the narrowed-down value of the friction coefficient may be reflected to the vehicle control of the traveling vehicle 200. For example, the driving torque of the vehicle 200 may be adjusted by means of the vehicle control apparatus 41 on the basis of the value of the friction coefficient narrowed down with high accuracy, i.e., the second range.

Thereafter, in Step 15, whether the system of the vehicle 200 has stopped may be determined. For example, if the system is determined as being OFF (Step 15: YES), the process may be ended. If the vehicle 200 is still traveling (Step 15: NO), the process may be returned to Step 10 and the above-described process may be repeated. Accordingly, for example, in a case where it changes from rainy to sunny while the vehicle 200 is traveling, the estimation apparatus 100 may determine the road-surface state as "DRY" again and repeat the process thereafter.

According to the estimation apparatus 100 for the vehicle 200 and the method of estimating the friction coefficient of the road surface according to the example embodiment described above, it is possible to estimate slipperiness (the value of the friction coefficient) of the road surface in the front region in the traveling direction in accordance with various traveling environments in advance, with high accuracy, and in a non-contact manner.

In the above description, some example embodiments of the technology are described in detail with reference to the accompanying drawings. However, it should be appreciated that the example embodiments of the technology described above are merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

That is, the state of the road surface may be grouped into four road-surface states in advance on the basis of the relationship among the temperature, the unevenness, and the moisture amount, and the road-surface state detection unit 51 may determine which of the road-surface states the state of the road surface belongs to. However, the method of determining the road-surface state is not limited to this example. For example, a light source applying three infrared-ray lights having mutually different wavelengths may be mounted on the vehicle 200 as the surrounding environment sensor 31, and the road-surface state detection unit 51 may identify the road-surface state on the basis of the three infrared-ray lights which has been reflected on the road surface and received.

In a case where the determined state of the road surface applies to two or more road-surface states (e.g., "WET" and "SNOW"), the estimation apparatus 100 may weight the road-surface states to narrow down the value of the friction coefficient and perform the secondary identification. As an example of such weighting, the road-surface state having a smaller value of friction coefficient among the two or more road-surface states determined attaching greater importance to safety may be weighted greater. Referring to the example described above, "SNOW" may be weighted greater, and the second range of the friction coefficient may be set more in the "SNOW" side than the intermediate value between "WET" and "SNOW", for example, at a ratio of 4:6.

Each of the road-surface state detection unit 51, the μ-value parameter acquisition unit 52, the μ-value calculation unit 53, and the vehicle control unit 56 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the road-surface state detection unit 51, the μ-value parameter acquisition unit 52, the μ-value calculation unit 53, and the vehicle control unit 56 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the road-surface state detection unit 51, the μ-value parameter acquisition unit 52, the μ-value calculation unit 53, and the vehicle control unit 56 illustrated in FIG. 2.

The invention claimed is:

1. An estimation apparatus configured to perform non-contact estimation of a friction coefficient of a road surface, the estimation apparatus comprising:
   one or more processors; and
   one or more memories communicably coupled to the one or more processors,
   wherein the one or more memories store (1) first information indicating two or more road-surface states, (2) second information indicating a first range of a friction coefficient corresponding individually to each of the two or more road-surface states, and (3) third information indicating a parameter specific to each friction coefficient, which corresponds individually to each of the two or more road-surface states,
   wherein the one or more processors are configured to:
      determine, using a first sensor, a state of the road surface and identify, based on the first information, one of the two or more road-surface states to which the state of the road surface belongs;
      acquire, using a second sensor that is different from the first sensor, and based on the third information, values of the parameter corresponding to the identified one of the two or more road-surface states; and
      acquire, based on the second information and the values of the parameters, a second range of the friction coefficient corresponding to the identified one of the two or more road-surface states, wherein the second range is within, and narrower than, the first range, and the friction coefficient is identified from a relationship between the second range and the parameter.

2. The estimation apparatus according to claim 1,
   wherein the parameter corresponds to one of friction force of rubber, snow column shearing force, and an edge effect that are caused between a tire of a vehicle and the road surface, and
   wherein the one or more processors are configured to select one of the friction force of rubber, the snow column shearing force, and the edge effect based on the third information.

3. The estimation apparatus according to claim 2, wherein the one or more processors are configured to:
   select unevenness of the road surface as the parameter corresponding to the friction force of the rubber in a case where the determined state of the road surface falls in a DRY section where the road surface is dry;
   select a thickness of a water film as the parameter corresponding to the friction force of the rubber in a case where the determined state of the road-surface falls in a WET section where the road surface is wet;
   select at least one of a density, a temperature of the road surface, or a moisture content rate as the parameter corresponding to the snow column shearing force in a case where the determined state of the road-surface falls in a SNOW section where the road surface is snowy; and
   select the temperature of the road surface or the thickness of the water film as the parameter corresponding to the friction force of the rubber and the edge effect in a case where the determined state of the road-surface state falls in an ICE section where the road surface is icy.

4. The estimation apparatus according to claim 1, wherein the one or more processors are configured to, when the determined state of the road surface belongs more than one of the two or more road-surface states, weight the more than one of the two or more road-surface states.

5. The estimation apparatus according to claim 2, wherein the one or more processors are configured to, when the determined state of the road surface belongs more than one of the two or more road-surface states, weight the more than one of the two or more road-surface states.

6. The estimation apparatus according to claim 3, wherein the one or more processors are configured to, when the determined state of the road surface belongs more than one of the two or more road-surface states, weight the more than one of the two or more road-surface states.

7. A vehicle comprising:
   the estimation apparatus according to claim 1; and
   a sensor configured to detect the state of the road surface.

8. A vehicle comprising:
   the estimation apparatus according to claim 2; and
   a sensor configured to detect the state of the road surface.

9. A vehicle comprising:
   the estimation apparatus according to claim 3; and
   a sensor configured to detect the state of the road surface.

10. A vehicle comprising:
    the estimation apparatus according to claim 4; and
    a sensor configured to detect the state of the road surface.

11. A vehicle comprising:
    the estimation apparatus according to claim 5; and
    a sensor configured to detect the state of the road surface.

12. A vehicle comprising:
the estimation apparatus according to claim 6; and
a sensor configured to detect the state of the road surface.

\* \* \* \* \*